United States Patent
Monchiero et al.

(10) Patent No.: US 8,312,126 B2
(45) Date of Patent: Nov. 13, 2012

(54) MANAGING AT LEAST ONE COMPUTER NODE

(75) Inventors: Matteo Monchiero, Palo Alto, CA (US); Parthasarathy Ranganathan, San Jose, CA (US); Vanish Talwar, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 273 days.

(21) Appl. No.: 12/715,056

(22) Filed: Mar. 1, 2010

(65) Prior Publication Data

US 2011/0213838 A1    Sep. 1, 2011

(51) Int. Cl.
*G06F 15/173* (2006.01)

(52) U.S. Cl. ........ 709/223; 709/217; 709/224; 709/227; 709/232

(58) Field of Classification Search .................. 709/201, 709/205, 217, 223, 224, 227, 232
See application file for complete search history.

(56) References Cited

U.S. PATENT DOCUMENTS

| | | | |
|---|---|---|---|
| 6,243,756 B1 * | 6/2001 | Whitmire et al. | 709/232 |
| 7,000,010 B1 * | 2/2006 | Jensen et al. | 709/219 |
| 7,865,775 B2 * | 1/2011 | Yao et al. | 714/36 |
| 7,904,546 B1 * | 3/2011 | Banda et al. | 709/224 |
| 2005/0228888 A1 * | 10/2005 | Mihm et al. | 709/227 |
| 2006/0074927 A1 * | 4/2006 | Sullivan et al. | 707/100 |
| 2009/0144568 A1 * | 6/2009 | Fung | 713/300 |
| 2009/0249120 A1 * | 10/2009 | Yao et al. | 714/15 |

\* cited by examiner

*Primary Examiner* — Ramy M Osman

(57) ABSTRACT

In a system for managing at least one computer node, a first device is configured to perform out-of-band operations in the at least one computing node. The system also includes a second device configured to perform compute-intensive tasks in the at least one computing node and a third device that is external to the at least one computing node configured to perform administration operations for the first device and the second device.

18 Claims, 4 Drawing Sheets

MANAGING AT LEAST ONE COMPUTER NODE

BACKGROUND

Hardware support for manageability is an important consideration in the operation of datacenters. Quality of manageability support has direct impact on administration costs of datacenters, which are a significant portion of a total cost for ownership (TCO) for an entire computing infrastructure. As management tasks become more complex, hardware provided by current management architectures is limited because of cost constraints. Currently, processor vendors are increasing use of multicore architectures that use multicore processors.

The multicore processors contain two or more independent processors. The independent processors or cores are known to roughly follow Moore's law, which requires that computing resources on a single socket grow exponentially with technology generations, pressing software to provide comparable increases in functionalities and parallelism. Unfortunately, conventional architectures having many cores are known to be unable to sustain peak performance. This happens because of a dynamism of applications (for instance, cloud computing) which makes usage of resources uneven over time. Additionally, the memory bandwidth and capacity constraints severely limit workload consolidation.

Most current solutions for low-level manageability are based on a management processor. The management processor is typically implemented as a small microcontroller or as a custom application specific integrated circuit (ASIC) solution. The management processor is known to permit access to a server independently of the status of a main processor, that is, even if the power is off or the server has crashed. This type of communication is said to use an "out-of-band" channel and allows for "lights-out" or "out-of-band" management. The management processor also interfaces with sensors, such as on-board temperature monitors, central processing unit (CPU) status sensors, and fans, and provides basic and advanced management functionalities, including inventory, power policy setting, power on/off, booting, and diagnostic operations.

Because the management processor is deployed in a de facto separate computer, it is straightforward to implement an independent out-of-band channel with sufficient reliability. However, this approach is known to constrain the complexity of the management tasks that are executable on the management system.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an example embodiment thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the description of the embodiments.

Disclosed herein is a system and method for managing at least one computing node. The system includes a first device (referenced herein as a M-bridge) configured to perform out-of-band operations in the at least one computing node, a second device (referenced herein as a central processing unit (CPU) on which a management software agent executes) configured to perform compute-intensive tasks in the at least one computing node, and a third device (referenced herein as an ensemble administrator module) configured to perform administration operations for the first device and the second device, in which the third device is external to the at least one computing node.

In one regard, the system disclosed herein differs from conventional management processors because the system disclosed herein splits up the functionalities of the conventional management processors into separate components. In addition, the first and second devices are internal to the computing nodes, whereas the third device is external to the computing nodes. In one respect, the system disclosed herein enables the use of relatively less expensive computing nodes (or servers) because the computing nodes implemented in the system are not required to contain custom management processors. Instead, the computing nodes include the first devices (M-bridges) that are much simpler and less expensive controllers.

In another respect, the system disclosed herein enables more sophisticated management functionalities to be run on the central processing units (CPUs) of the computing nodes. As such, the third device, which is external to the computing nodes, need not have relatively high computational abilities.

Figure 1:
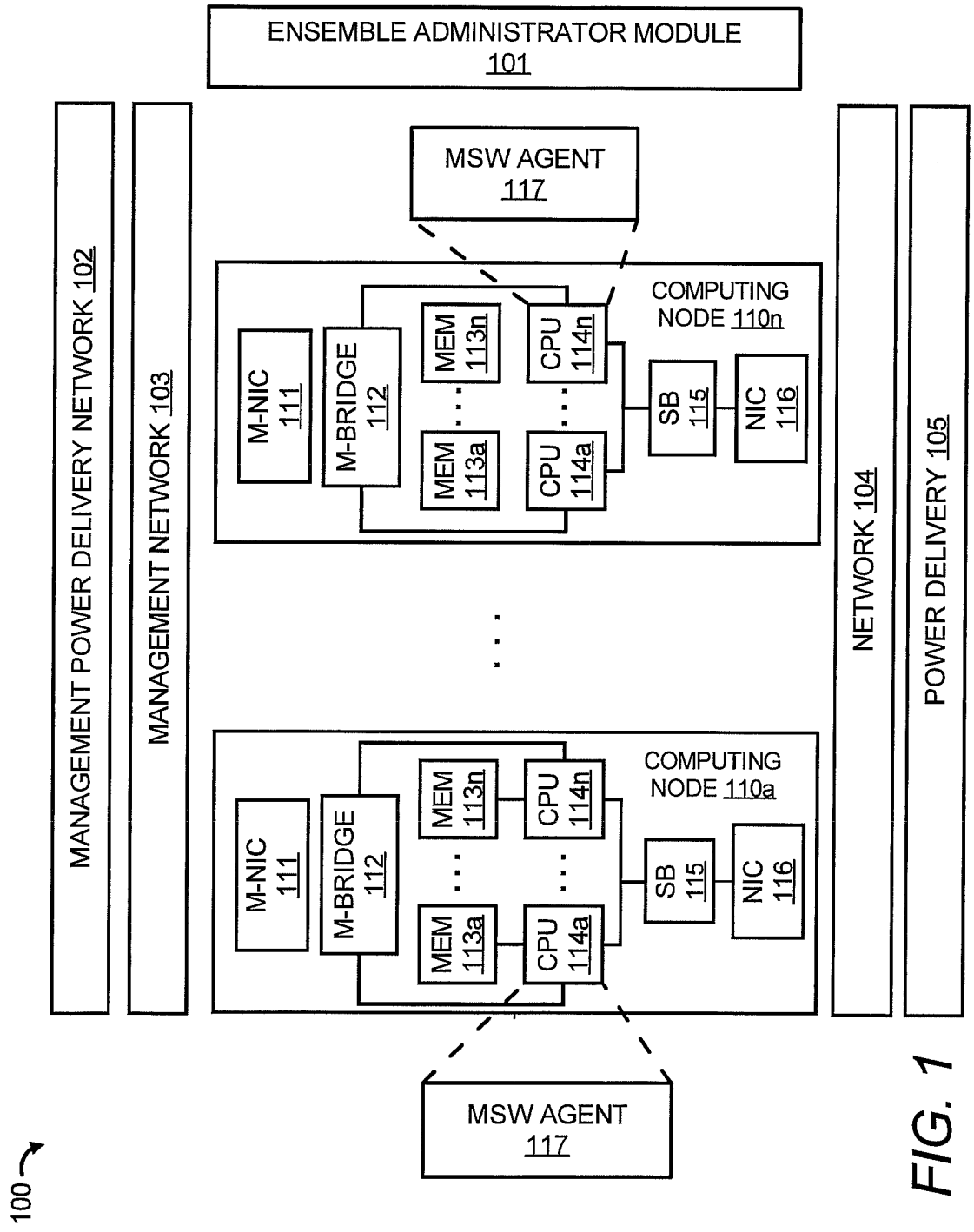
FIG. 1 shows a simplified block diagram of a system for managing at least one computer node, according to an example embodiment of the present invention.

With reference first to FIG. 1, there is shown a simplified block diagram of a system 100 for managing computing nodes, according to an embodiment. It should be clearly understood that the system 100 may include additional components and that some of the components described herein may be removed and/or modified without departing from a scope of the system 100. As such, the system 100 may include any number of computing nodes, CPUs, and memories.

As shown in FIG. 1, the system 100 includes an ensemble administrator module 101, a management power delivery network 102, a management network 103, and multiple computing nodes 110a-110n. Each computing node 110a, 110b may comprise a server and includes a management network interface controller (M-NIC) 111, an M-Bridge 112, a plurality of memories (MEMs) 113a-113n, a plurality of central processing units (CPUs) 114a-114n, a south bridge (SB) 115, a network interface controller (NIC) 116, and a management software (MSW) agent 117. In addition, the system 100 includes a network 104 and a power delivery network 105.

The network 104, the power delivery 105 and other portions of the computing nodes 110a-110n, for instance the memories 113a-113n, the CPUs 114a-114n, the SBs 115, and the NICs 116 form a user sub-system, which may be used by an end user. The computing nodes 110a-110n connect to the network 104 through the SBs 115 and the NICs 116. The SB 115 is a controller that is responsible for relatively slower devices on the computing nodes 110a-110n-110n. A northbridge (not shown) may also be used to handle communications between the CPUs 114a-114n and the SB 115.

As shown in FIG. 1, the computing nodes 110a-110n connect to the management network 103 through respective M-NICs 111 and M-Bridges 112. The management network 103 is a dedicated network for management functions in the system 100 and is separate from the network 104. The management power delivery network 102 provides a power supply for management functions that is always available, even for instance, where the computing nodes 110a-110n crash or power through the power delivery 105 is unavailable.

Management functions of the system 100 are defined in three main components that may be performed by three different devices in the system 100, and more particularly, in the management sub-system. These management functions are out-of-band operations, compute-intensive tasks and administration operations.

A first device, for instance the M-Bridge 112 in each computing node 110a-110n, is configured to perform out-of-band operations. Generally speaking, the out-of-band operations may be required during operation of the computing nodes 110a-110n and in instances where the computing nodes 110a-110n crash, or when the computing nodes 110a-110n are turned off. For instance, out-of-band operations may include turning a computing node 110a-110n on, monitoring of statuses of one or more CPUs 114a-114n, monitoring statuses of on-board sensors (not shown), monitoring statuses of inventory monitoring operations, monitoring statuses of voltage levels, implementing fan control operations, etc. In addition, the out-of-band operations are mapped to the respective M-Bridges 112, the management network 103, and the management power delivery network 102.

A second device, for instance the CPU 114a-114n in each computing node 110a-110n on which a MSW agent 117 executes, performs the compute-intensive tasks. The CPUs 114a-114n are configured to perform other processing operations, such as, various user applications. Generally speaking, the compute-intensive tasks are operations at the computing nodes 110a-110n requiring the computing power of a CPU. For instance, compute-intensive tasks may include diagnostics, malware detection, application of a software redundant array of inexpensive disks (RAID), etc.

A third device, for instance the ensemble administrator module 101, which is external to the computing nodes 110a-110n, performs the administration operations. The administration operations may include coordination of the out-of-band operations in the first device and the compute-intensive tasks in the second device, as well as operations that provide a user interface, etc. For example, the administration operations may expose the power on/off buttons of all the computing nodes 110a-110n to an administrator.

A fourth device, for instance the M-NIC 111, is connected between the first device (M-Bridge 112) and the management network 103. The M-NIC 111 is configured to operate as an interface between the management network 103 and the first device in each computing node 110a-110n.

The first devices or M-Bridges 112 may be relatively small microcontrollers local to the CPUs 114a-114n in the computing nodes 110a-110n. The M-Bridges 112 may be implemented as relatively low-power application specific integrated circuits (ASICs), and are responsible for managing basic signals going to/from the components of the respective computing nodes 110a-110n, and mainly the CPUs 114a-114n. For instance, an M-Bridge 112 may consolidate control wires coming out of a socket in the computing node 110a, may receive video output, and may interface with a serial console. Among the signals handled by the M-Bridges 112 are signals controlling turning on/turning off, voltage levels, sensors, and fans, of the respective computing nodes 110a-110n as discussed above.

The M-Bridges 112 may have a relatively limited set of fixed functionalities, for instance, forwarding signals to the ensemble administrator module 101, which directly controls the M-Bridges 112. In one regard, the M-Bridges 112 differ from conventional management processors because the M-Bridges 112 are stateless devices that consolidate management signals coming from/going to the ensemble administrator module 101. The M-Bridges 112 therefore process each signal as an independent transaction unrelated to any previous signal. The M-Bridges 112 may also drive a signal that brings the MSW agent 117 that is running on the CPU 114a-114n of the computing node 110 up or down.

The MSW agent 117, which may comprise a software module executable by one or more CPUs 114a-114n of the computing nodes 110a-110n, is configured for on-line management of applications that may need access to a full-fledged CPU, for instance monitoring, diagnostics, and run-time power management. For instance, the MSW agent 117 may be implemented using virtualization technology as a management virtual machine. Further, the MSW agent 117 may be activated or queried by the M-Bridge 112 using a driver residing in a Hypervisor/Driver Domain of the computing node 110a-110n. Alternately, the MSW agent 117 may be implemented using an interrupt to invoke the MSW agent 117 on the CPU 114a-114n. The MSW agent 117 may run locally on a single CPU 114a-114n in the computing nodes 110a-110n and may be scheduled periodically by platform hardware of the computing nodes 110a-110n.

The ensemble administrator module 101 comprises hardware, software or a combination of hardware and software that operates as a centralized module through which an administrator or manager may log in to access administrative functionality in the system 100. For instance, the ensemble administrator module 101 may drive the M-Bridges 112 for out-of-band operations at each of the computing nodes 110a-110n. In current systems, to turn off a computing node, an administrator is required to locate a management processor for the computing node and perform the operation. In contrast, in the system 100, the administrator or manager may implement or invoke the ensemble administrator module 101 to access the M-Bridge 112 of a particular computing node 110a to turn off that computing node 110a. The M-Bridge 112 may therefore be used as an extension of the ensemble administrator module 101.

The ensemble administrator module 101 may be configured to control multiple M-Bridges 112 and MSW agents 117 in an entire system 100, for instance a rack or a data center. The ensemble administrator module 101 is thereby operable to deploy higher-level policies that may affect the entire data center. The system 100 is a distributed system in which required functionality in the M-Bridges 112 is available through the ensemble administrator module 101 without permanently providing that functionality in every M-Bridge 112 in the rack or data center. Alternately, however, the system 100 may be configured with multiple ensemble administrator modules 101 for enhanced availability of the management sub-system.

Examples of methods in which the system 100 may be employed for managing the computing nodes 110a-110n will now be described with respect to the following flow diagram of the method 200 depicted in FIG. 2. It should be apparent to those of ordinary skill in the art that the method 200 represents a generalized illustration and that other steps may be added or existing steps may be removed, modified or rearranged without departing from the scope of the method 200.

The description of the method 200 is made with reference to the system 100 illustrated in FIG. 1, and thus makes reference to the elements cited therein. It should, however, be understood that the method 200 is not limited to the elements set forth in the system 100. Instead, it should be understood that the method 200 may be practiced by a system having a different configuration than that set forth in the system 100.

At step 201, administrative instructions are provided for the first and second device using the third device. The first device may be an M-Bridge 112, the second device may be a CPU 114a-114n configured to implement or execute an MSW agent 117, and the third device may be the ensemble administrator module 101 depicted in FIG. 1. As discussed above, the ensemble administrator module 101 performs administration operations for the M-Bridge 112 and the MSW agent 117. The administration operations include, for instance, coordination of the aforementioned tasks and user interface.

At step 202, out-of-band operations are performed using the first device (M-Bridge 112) in a computing node 110a. The out-of-band operations may be required during operation of the computing node 110a and in instances where the computing node 110a crashes, or when power of the computing node 110a is off, as discussed in greater detail herein above.

The M-Bridge 112 may report various information to the ensemble administrator module 101 at step 203. For instance, the M-Bridge 112 may provide the statuses of the CPUs 114a-114n or the voltage level in the computing node 110a to the ensemble administrator module 101 over the management network 103.

At step 204, the CPU 114a-114n on which the MSW agent 117 is implemented or executed in the computing node 110a performs the compute-intensive tasks. As discussed above, the compute-intensive tasks may include diagnostics, malware detection, managing a software redundant array of inexpensive disks (RAID), etc. According to an example, the CPU 114a-114n on which the MSW agent 117 is implemented or executed is configured to perform the compute-intensive tasks based upon administrative instructions received from the ensemble administrator module 101.

Some or all of the operations set forth in the figures may be contained as a utility, program, or subprogram, in one or more computer readable storage mediums. In addition, the operations may be embodied by computer programs, which can exist in a variety of forms both active and inactive. For example, they may exist as software program(s) comprised of program instructions in source code, object code, executable code or other formats. Any of the above may be embodied on a computer readable storage medium, which include storage devices.

Exemplary computer readable storage devices include conventional computer system random access memory (RAM), read-only memory (ROM), erasable programmable read-only memory (EPROM), electrically erasable programmable read-only memory (EEPROM), and magnetic or optical disks or tapes. Concrete examples of the foregoing include distribution of the programs on a compact disc read only memory (CD ROM) or via Internet download. It is therefore to be understood that any electronic device capable of executing the above-described functions may perform those functions enumerated above.

Figure 2:
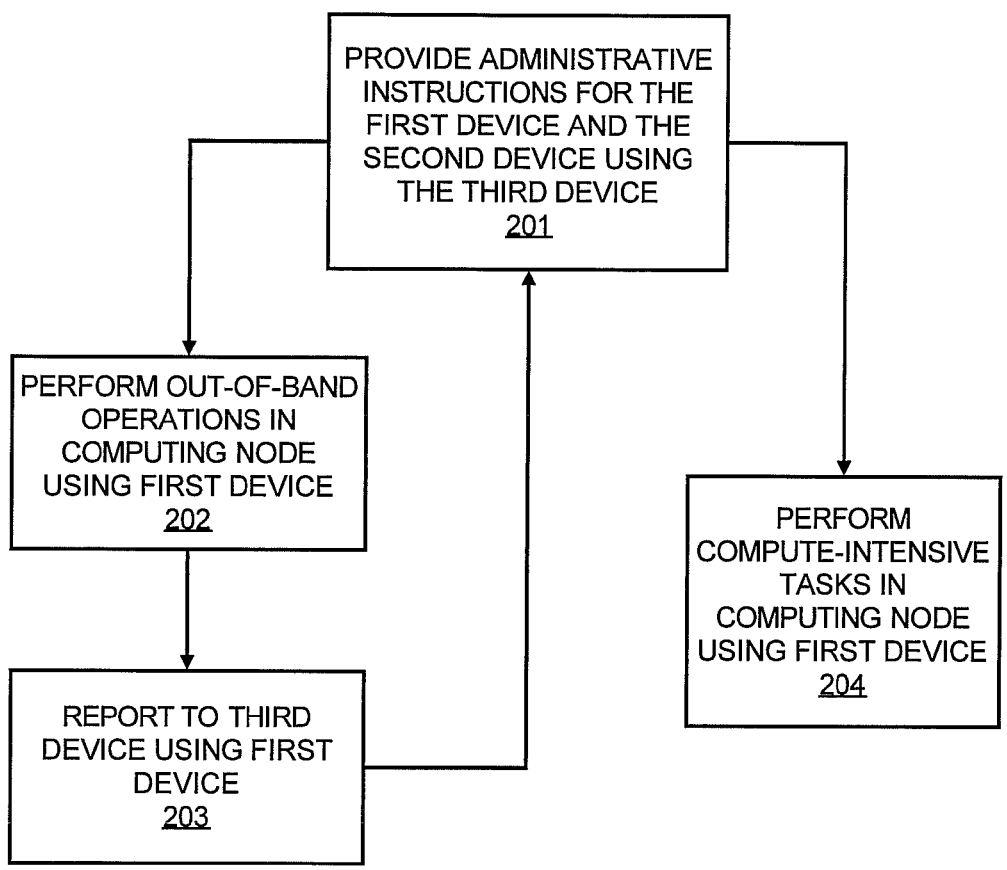
FIG. 2 illustrates a flowchart of a method of managing at least one computer node, according to an example embodiment of the present invention.
Figure 3:
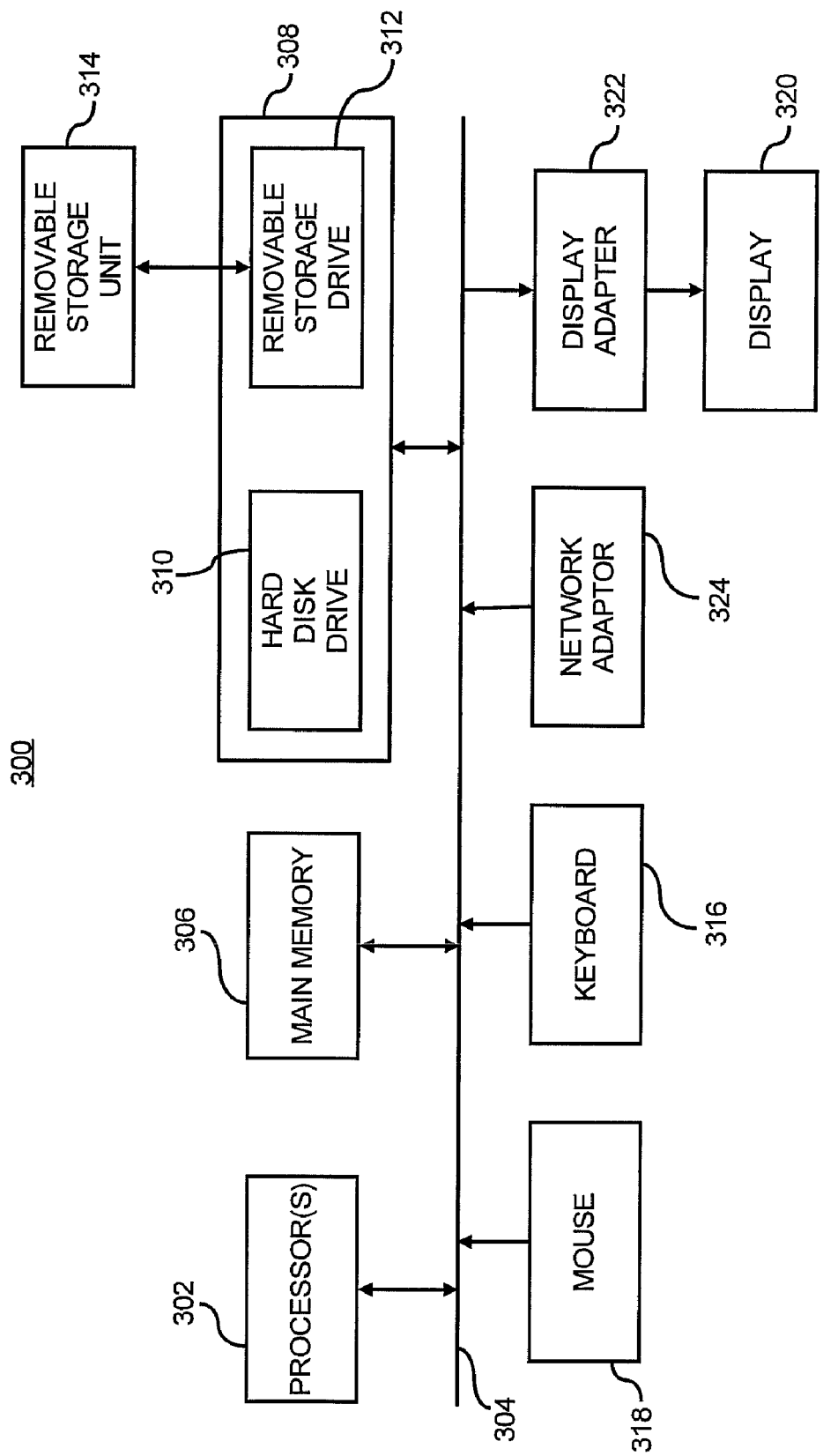
FIGS. 3 and 4 illustrate respective block diagrams of computer apparatuses configured to implement or execute one or more of the processes depicted in FIG. 2, according to an example embodiment of the present invention.
Figure 4:
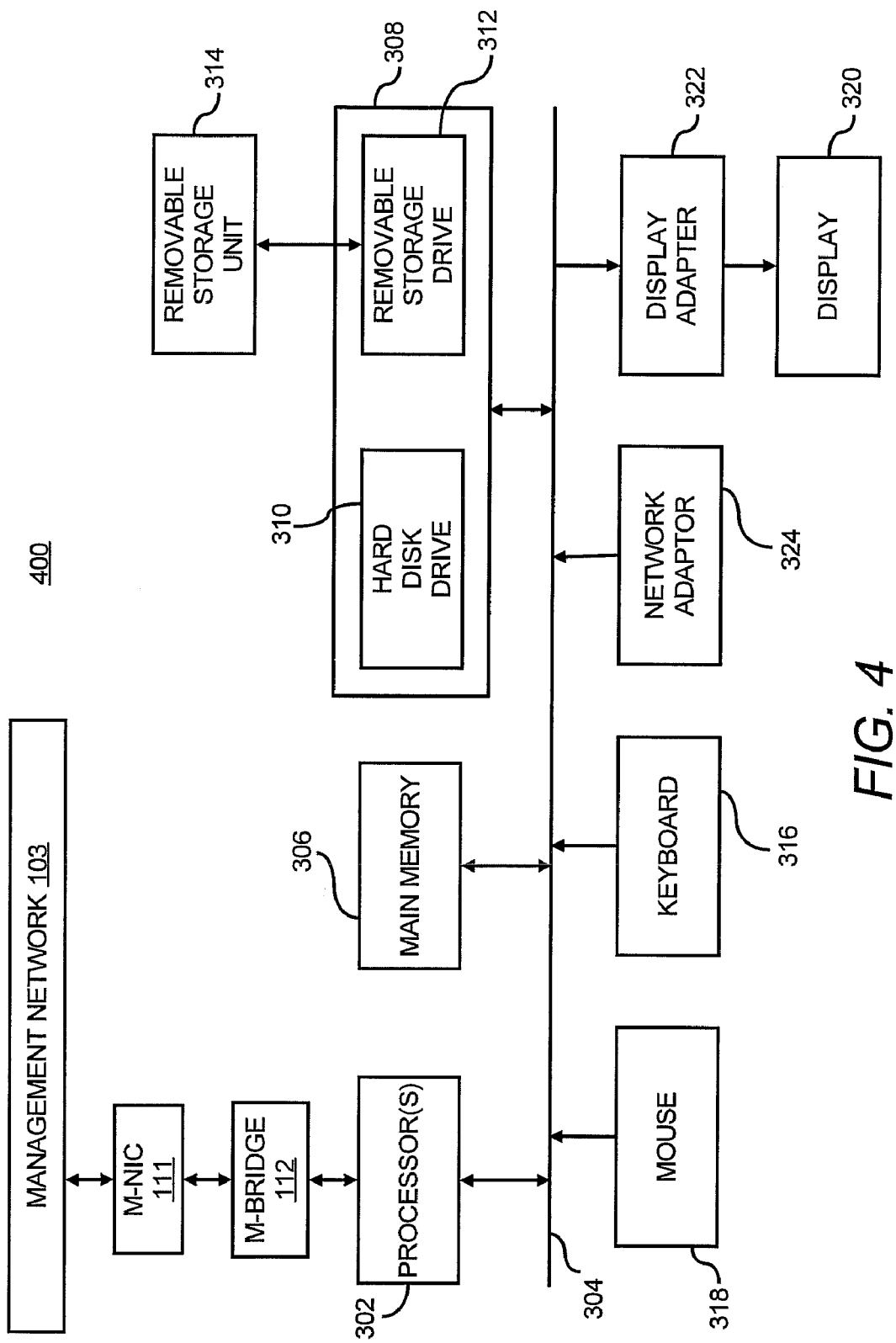

FIGS. 3 and 4 illustrate respective block diagrams of computing apparatuses 300 and 400 configured to implement or execute one or more of the processes depicted in FIG. 2, according to an embodiment. It should be understood that the illustration of the computing apparatuses 300 and 400 are generalized illustrations and that the computing apparatuses 300 and 400 may include additional components and that some of the components described may be removed and/or modified without departing from the scopes of the computing apparatuses 300 and 400. In one regard, the computing apparatus 300 depicted in FIG. 3 represents an example of the ensemble administrator module 101 depicted in FIG. 1. In addition, the computing apparatus 400 depicted in FIG. 4 represents an example of a computing node 110a.

With reference first to FIG. 3, the computing apparatus 300 includes one or more processors 302 that may implement or execute some of the steps described in FIG. 2. For instance, the processor(s) 302 are configured to provide administrative instructions to the first device and to receive reports from the first device.

Commands and data from the processors 302 are communicated over a communication bus 304. The computing apparatus 300 also includes a main memory 306, such as a random access memory (RAM), where the program code for the processor(s) 302, may be executed during runtime, and a secondary memory 308. The secondary memory 308 includes, for example, one or more hard disk drives 310 and/or a removable storage drive 312, representing a floppy diskette drive, a magnetic tape drive, a compact disk drive, etc., where a copy of the program code for one or more of the processes depicted in FIG. 2 may be stored.

The removable storage drive 310 reads from and/or writes to a removable storage unit 314 in a well-known manner. User input and output devices may include a keyboard 316, a mouse 318, and a display 320. A display adaptor 322 may interface with the communication bus 304 and the display 320 and may receive display data from the processor(s) 302 and convert the display data into display commands for the display 320. In addition, the processor(s) 302 may communicate with the computing nodes 110a-110n, and more particularly, the M-Bridges 112 over the management network 103 through a network adaptor 324.

Turning now to FIG. 4, the computing apparatus 400 includes all of the same components discussed above with respect to the computing apparatus 300 depicted in FIG. 3. Thus, only those components that differ from the computing apparatus 300 depicted in FIG. 3 will be discussed with respect to the computing apparatus 400 depicted in FIG. 4.

As shown therein, the processor(s) 302, which comprise the CPUs 114a-114n of the computing node 110a, also communicate with the M-Bridge 112. In addition, the M-Bridge 112 sends and receives data through the M-NIC 111 over the management network 103. As discussed above with respect to the CPUs 114a-114n, the processor(s) 302 are configured to implement and/or invoke the MSW agent 117 to perform compute-intensive tasks.

It will be apparent to one of ordinary skill in the art that other known electronic components may be added or substituted in the computing apparatuses 300 and 400. It should also be apparent that one or more of the components depicted in FIGS. 3 and 4 may be optional (for instance, user input devices, secondary memory, etc.).

What have been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. A system for managing at least one computing node, said system comprising:
   a first device configured to perform out-of-band operations in the at least one computing node;
   a second device configured to perform compute-intensive tasks in the at least one computing node; and
   a third device configured to perform administration operations for the first device and the second device, wherein the third device is external to the at least one computing node and wherein the administration operations comprise coordination of the out-of-band operations in the first device and the compute-intensive tasks in the second device.

2. The system of claim 1, wherein the first device and the second device are internal to the at least one computing node.

3. The system of claim 1, wherein the out-of-band operations comprise at least one of a computing node turn on operation, a status of a computer processing unit (CPU) monitoring operation in the at least one computing node, a status of on-board sensors monitoring operation of the at least one computing node, a fan control operation in the at least one computing node, a status of inventory monitoring operation in the at least one computing node, and a status of voltage levels monitoring operation in the at least one computing node.

4. The system of claim 1, wherein the compute-intensive tasks comprise at least one of a diagnostic operation, malware detection, and application of a software redundant array of inexpensive disks (RAID).

5. The system of claim 1, further comprising:
   a management power delivery network configured to deliver power independently to the first device, wherein the management power delivery network is separate from a network for delivering power to the at least one computing node.

6. The system of claim 5, further comprising:
   a management network configured to connect the first device to the third device, wherein the management network is separate from a network over which the at least one computing node communicates with the at least one computing device.

7. The system of claim 6, wherein the first device, the second device, the third device, the management power delivery network, and the management network form a management sub-system independent of a user network for the at least one computing node and the management sub-system is configured to be independently available from the user network.

8. The system of claim 6, wherein the at least one computing node further comprises:
   a fourth device connected between the management network and the first device, said fourth device being configured to operate as an interface between the management network and the first device.

9. The system of claim 1, wherein the second device comprises a management software agent configured to perform the compute-intensive tasks on at least one CPU of the computing node.

10. The system of claim 1, wherein the second device comprises a management virtual machine.

11. A method for managing at least one computing node, said method comprising:
    performing out-of-band operations in the at least one computing node using a first device;
    performing compute-intensive tasks in the at least one computing node using a second device; and
    performing administration operations for the first device and the second device using a third device, wherein performing administration operations comprises coordinating the out-of-band operations in the first device and the compute-intensive tasks in the second device, and wherein the third device is external to the at least one computing node.

12. The method according to claim 11, wherein performing the out-of-band operations comprises at least one of turning the at least one computing node on, monitoring a status of a computer processing unit (CPU) of the at least one computing node, monitoring a status of on-board sensors of the at least one computing node, performing fan control in the at least one computing node, monitoring a status of inventory in the at least one computing node, and monitoring a status of voltage levels in the at least one computing node.

13. The method according to claim 11, wherein performing the compute-intensive tasks comprises at least one of performing diagnostics, performing malware detection, and software redundant array of inexpensive disks (RAID) in the at least one computing node.

14. The method according to claim 11, further comprising:
    supplying power to the first device through a management power delivery network, wherein the management power delivery network is separate from a network for delivering power to the at least one computing node.

15. The method according to claim 11, further comprising:
    enabling communications between the first device and the third device through a management network, wherein the management network is separate from a network over which the at least one computing node communicates with the at least one computing device.

16. The method according to claim 15, wherein enabling communications further comprises enabling communications through a fourth device connected as an interface between the first device and the management network.

17. The method according to claim 11, wherein the second device comprises a management software agent configured to perform the compute-intensive tasks on at least one CPU of the computing node.

18. At least one non-transitory computer readable storage medium on which is embedded one or more computer programs, said one or more computer programs implementing a method of managing at least one computer node, said one or more computer programs comprising a set of instructions for:
    performing out-of-band operations in the at least one computing node using a first device, wherein the out-of-band operations comprise at least one of turning the at least one computing node on, monitoring a status of a computer processing unit (CPU) of the at least one computing node, monitoring a status of on-board sensors of the at least one computing node, performing fan control in the at least one computing node, monitoring a status of inventory in the at least one computing node, and monitoring a status of voltage levels in the at least one computing node;
    performing compute-intensive tasks in the at least one computing node using a second device, wherein the compute-intensive tasks comprise at least one of performing diagnostics, performing malware detection, and software redundant array of inexpensive disks (RAID) in the at least one computing node; and
    performing administration operations for the first device and the second device using a third device, wherein the third device is external to the at least one computing node, and wherein the administration operations comprises coordinating the out-of-band operations in the first device and the compute-intensive tasks in the second device.

* * * * *